(12) United States Patent
Railsback (10) Patent No.: US 8,021,096 B2
(45) Date of Patent: Sep. 20, 2011

(54) TRUCK BED

(76) Inventor: Dan Railsback, Humboldt, NE (US)

( * ) Notice: Subject to any disclaimer, the term of this patent is extended or adjusted under 35 U.S.C. 154(b) by 191 days.

(21) Appl. No.: 12/583,370

(22) Filed: Aug. 19, 2009

(65) Prior Publication Data

US 2011/0044790 A1 Feb. 24, 2011

(51) Int. Cl.
*B60P 1/00* (2006.01)

(52) U.S. Cl. .................. 414/478; 414/477; 414/493

(58) Field of Classification Search .............. 414/446, 414/477, 478, 491, 493, 547; 298/12
See application file for complete search history.

(56) References Cited

U.S. PATENT DOCUMENTS

| | | | |
|---|---|---|---|
| 3,074,574 A | 1/1963 | Prince | |
| 3,430,792 A | 3/1969 | Grove et al. | |
| 4,456,420 A | 6/1984 | Newhard | |
| 4,548,541 A | 10/1985 | Corompt | |
| 4,702,662 A | 10/1987 | Marlett | |
| 5,246,329 A | 9/1993 | Farrell | |
| 5,601,393 A * | 2/1997 | Waldschmitt | 414/498 |
| 6,457,931 B1 * | 10/2002 | Chapman | 414/491 |
| 6,761,524 B2 * | 7/2004 | Chabanas et al. | 414/491 |
| 6,817,825 B1 | 11/2004 | O'Hagen | |
| 7,037,062 B2 | 5/2006 | Oliver | |
| 2006/0182573 A1 * | 8/2006 | Taylor | 414/477 |
| 2008/0206032 A1 | 8/2008 | Hall | |

* cited by examiner

*Primary Examiner* — Scott Lowe

(74) *Attorney, Agent, or Firm* — Dennis L. Thomte; Thomte Patent Law Office LLC (57) ABSTRACT

A truck bed is disclosed which is movably mounted on the frame of a truck so as to be selectively movable from a transport position on the truck frame to a loading/unloading position rearwardly of the truck.

7 Claims, 9 Drawing Sheets

TRUCK BED

BACKGROUND OF THE INVENTION

1. Field of the Invention

This invention relates to a truck bed and more particularly to a truck bed which is movably mounted on a truck so as to be selectively movable between a transport position on the truck to a loading/unloading position rearwardly of the truck.

2. Description of the Related Art

Many types of truck beds have been previously provided but none are believed to accomplish the results of the instant invention. Owners of all-terrain vehicles, snowmobiles, garden tractors, riding mowers, etc. frequently need to transport the vehicles and other equipment from one location to another. In many cases, the vehicles are loaded onto the truck beds or pickup boxes by means of ramps which extend downwardly and rearwardly from the rearward end of the bed or box. The ramps may be difficult to properly position and may not always remain in a secure position making it difficult to load the vehicle onto the truck and to unload the same from the truck. Further, the use of ramps which extend downwardly and rearwardly from the truck bed or box are steeply inclined which makes it difficult to move the vehicles upwardly on the ramps and move the vehicles downwardly on the ramps.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A truck bed is disclosed which is selectively movably positioned on a truck rearwardly of the cab of the truck from a transport position to a loading/unloading position rearwardly of the vehicle. A bed frame is secured to the wheeled frame of the truck rearwardly of the cab of the truck and includes longitudinally extending first and second horizontally disposed and horizontally spaced frame rails with forward and rearward ends. A movable carriage assembly is longitudinally movably mounted on the bed frame. The carriage assembly includes: (a) an elongated front support, having first and second ends, extending between the first and second frame rails of the bed frame; (b) a first roller mounted on the first end of the first support which movably engages the first frame rail of the bed frame; (c) a second roller mounted on the second end of the first support which movably engages the second frame rail of the bed frame; (d) an elongated intermediate support spaced rearwardly of the front support and which has first and second ends with the intermediate support extending between the first and second frame rails of the bed frame; (e) a third roller mounted on the first end of the intermediate support which movably engages the first frame rail of the bed frame; (f) a fourth roller mounted on the second end of the intermediate support which movably engages the second frame rail of the bed frame; (g) a rear support, having forward and rearward ends, secured to the intermediate support and which extends rearwardly from the intermediate support; (h) a fifth roller secured to the rear support adjacent the rearward end thereof which movably engages one of the first and second frame rails of the bed frame; (i) a first power cylinder which is movable between retracted and extended positions and which has a base end and a rod end; (j) the base end of the first power cylinder is secured to the front support; (k) the rod end of the first power cylinder is secured to the intermediate support; (l) a second power cylinder which is movable between retracted and extended positions and which has a base end and a rod end; (m) the base end of the second power cylinder is secured to the bed frame adjacent the forward end thereof; (n) the rod end of the second power cylinder is secured to the rear support; (o) a pair of elongated pivot arms having first and second ends; (p) the first ends of the pivot arms being operatively pivotally secured to the front support; (q) a bed connector having a first connector portion, an intermediate connector portion and a second connector portion; (r) the first connector portion is pivotally secured to the intermediate support; (s) the first connector portion is pivotally connected to the pair of pivot arms between the pivotal connection of the first connector portion with the intermediate portion and the intermediate connector portion.

The truck bed is positioned on the bed frame rearwardly of the cab with the truck bed including a support bed portion having a forward end, a rearward end and opposite sides. The truck bed also includes an upstanding front wall having rearward and forward sides. The third connector portion is pivotally secured, about a horizontal axis to the front wall of the truck bed at the forward side thereof. The truck bed is selectively movable between a transport position wherein the support bed is in a horizontally disposed position over the wheeled frame of the truck and a loading/unloading position wherein the support bed is positioned rearwardly of the wheeled frame. The first power cylinder is in its extended position when the truck bed is in its transport position and is in its retracted position when the truck bed is in its loading/unloading position. The second power cylinder is in its retracted position when the truck bed is in its transport position and is in its extended position when the truck bed is in its loading position. The second connector portion of the bed connector is positioned forwardly of the front wall of the truck bed when the truck bed is in its transport position.

It is therefore a principal object of the invention to provide an improved truck bed which is selectively movable between a transport position on the truck to a loading/unloading position rearwardly of the truck.

A further object of the invention is to provide a truck bed for a truck wherein the bed may be moved from a transport position to a loading position rearwardly of the truck so that a vehicle such as an ATV, snowmobile, garden tractor, lawn mower, etc. may be loaded onto the truck bed, when in its loading position with the truck bed then being raised upwardly and forwardly onto the truck to its transport position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 9:
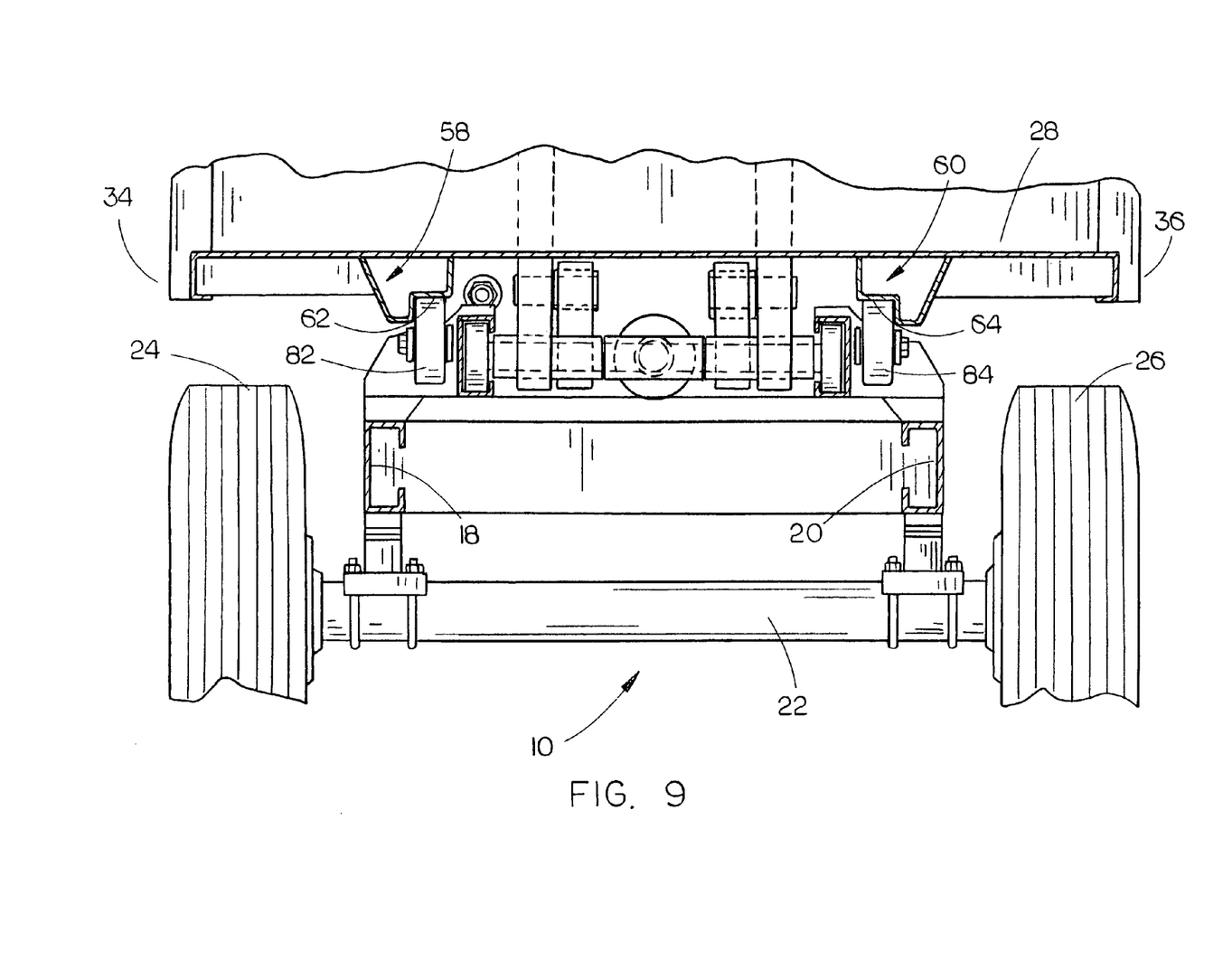
FIG. 9 is a partial sectional view as seen from the rear end of the truck bed of this invention in its transport position.

The numeral 10 refers to a conventional truck including a forward end 12 and a rearward end 14. Truck 10 includes a cab 16 and a pair of longitudinally extending frame members or rails 18 and 20 which includes at least one axle 22 having wheels 24 and 26 mounted thereon (FIG. 9).

Figure 6:
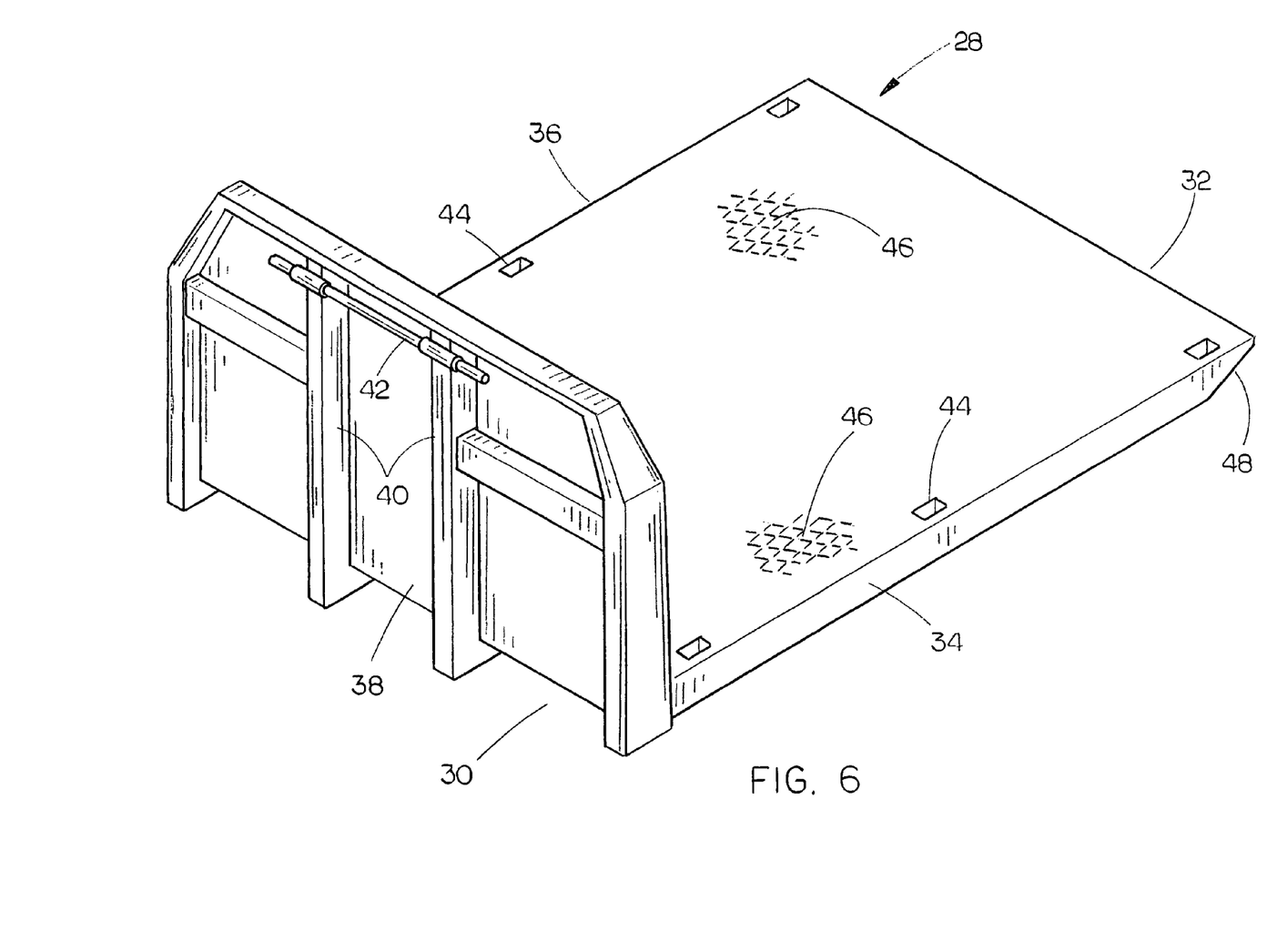
FIG. 6 is a front perspective view of a truck bed of this invention.
Figure 7:
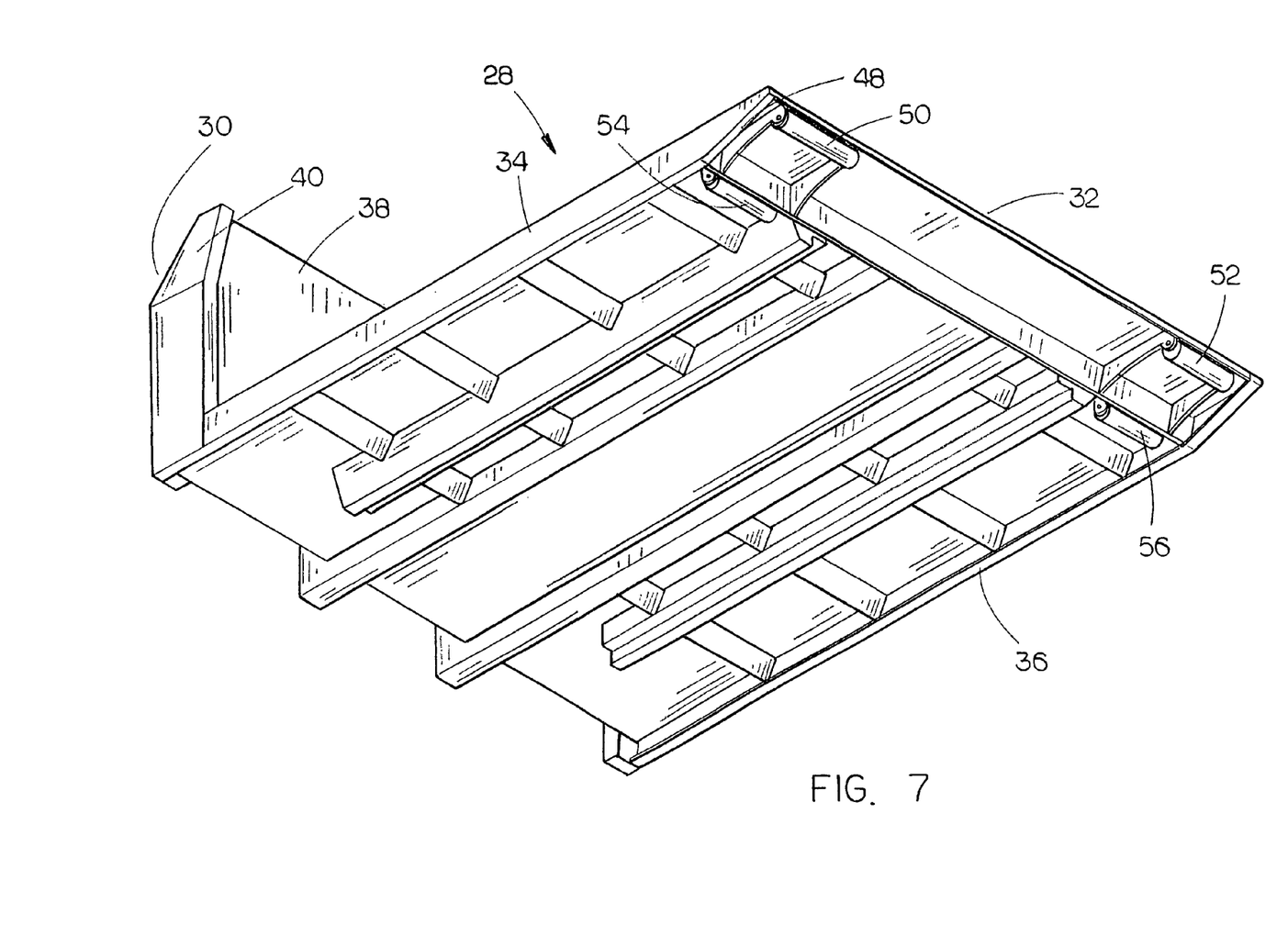
FIG. 7 is a perspective view illustrating the underside of the truck bed of FIG. 6.

The truck 10 has a bed 28 movably mounted thereon having a forward end 30, a rearward end 32 and opposite sides 34 and 36 (FIG. 6). Although bed 28 preferably is of the stake bed or flat bed type, the bed 28 could be a pick-up box having upstanding side walls. As seen in FIG. 6, bed 28 includes an upstanding front wall 38 having horizontally spaced-apart and vertically disposed support posts or frame members 40. A horizontally extending pivot rod 42 is secured to and extends between the two innermost posts 40 as seen in FIG. 6. Bed 28 preferably has stake or tie-down openings 44 formed therein (FIG. 6). The upper surface of bed 28 preferably has an irregular surface 46 to enable a vehicle such as an ATV, snowmobile, etc. to drive thereon as will be described hereinafter. The rearward end of bed 28 is preferably tapered or beveled at 48 as seen in FIGS. 6 and 7. A pair of rollers 50 and 52 are rotatably mounted on the underside of bed 28 as seen in FIG. 7. A pair of rollers 54 and 56 are rotatably mounted on the underside of bed 28 forwardly of rollers 50 and 52 respectively (FIG. 7). A pair of longitudinally extending guide rails 58 and 60 are secured to the underside of bed 28 as seen in FIG. 9 and have guide surfaces 62 and 64 provided thereon respectively.

Figure 1:
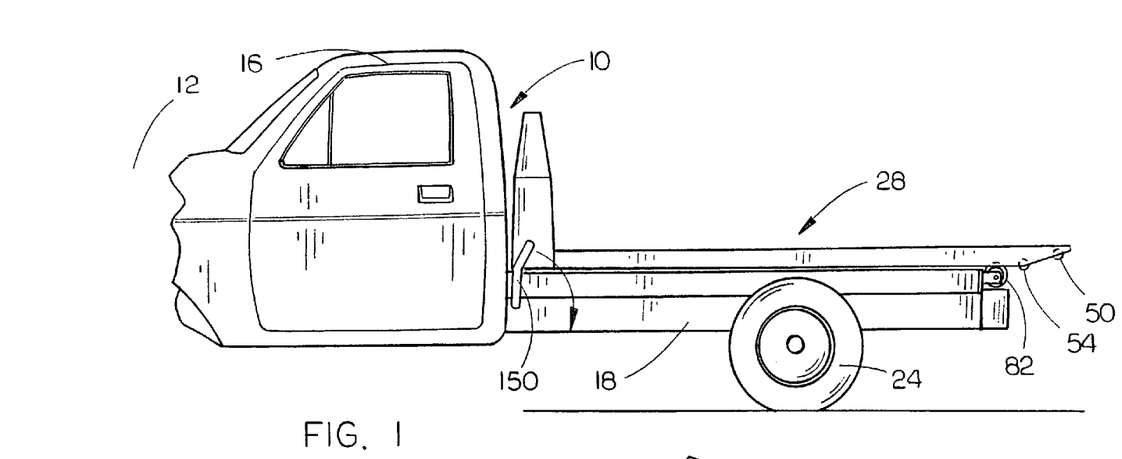
FIG. 1 is a partial side view of a truck having the truck bed of this invention mounted thereon and which is illustrated in its transport position.
Figure 3:
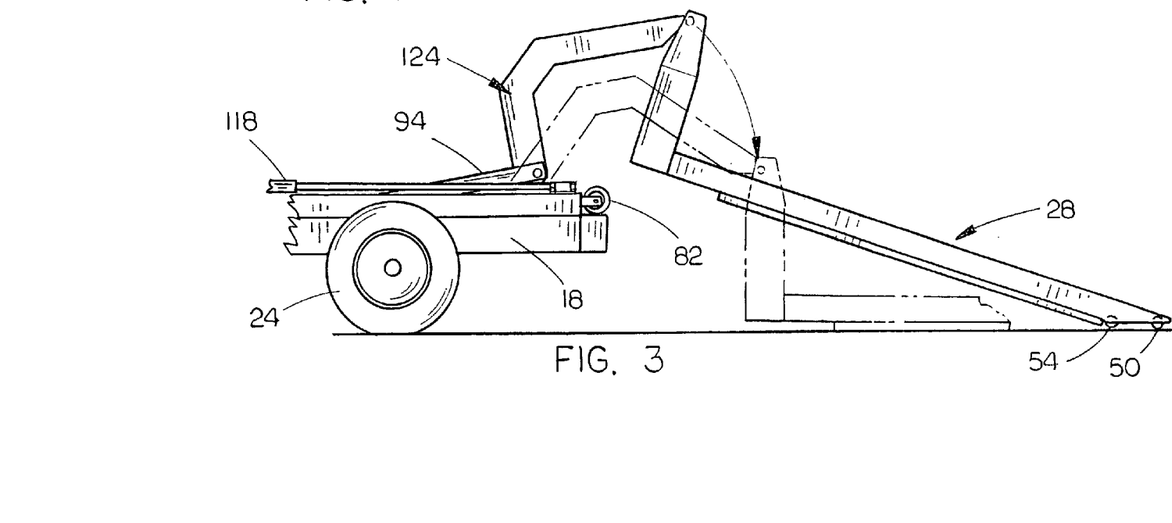
FIG. 3 is a view similar to FIG. 2 except that the truck bed has been moved rearwardly from the position of FIG. 2 and with the broken lines illustrating the truck bed positioned in its loading position.
Figure 8:
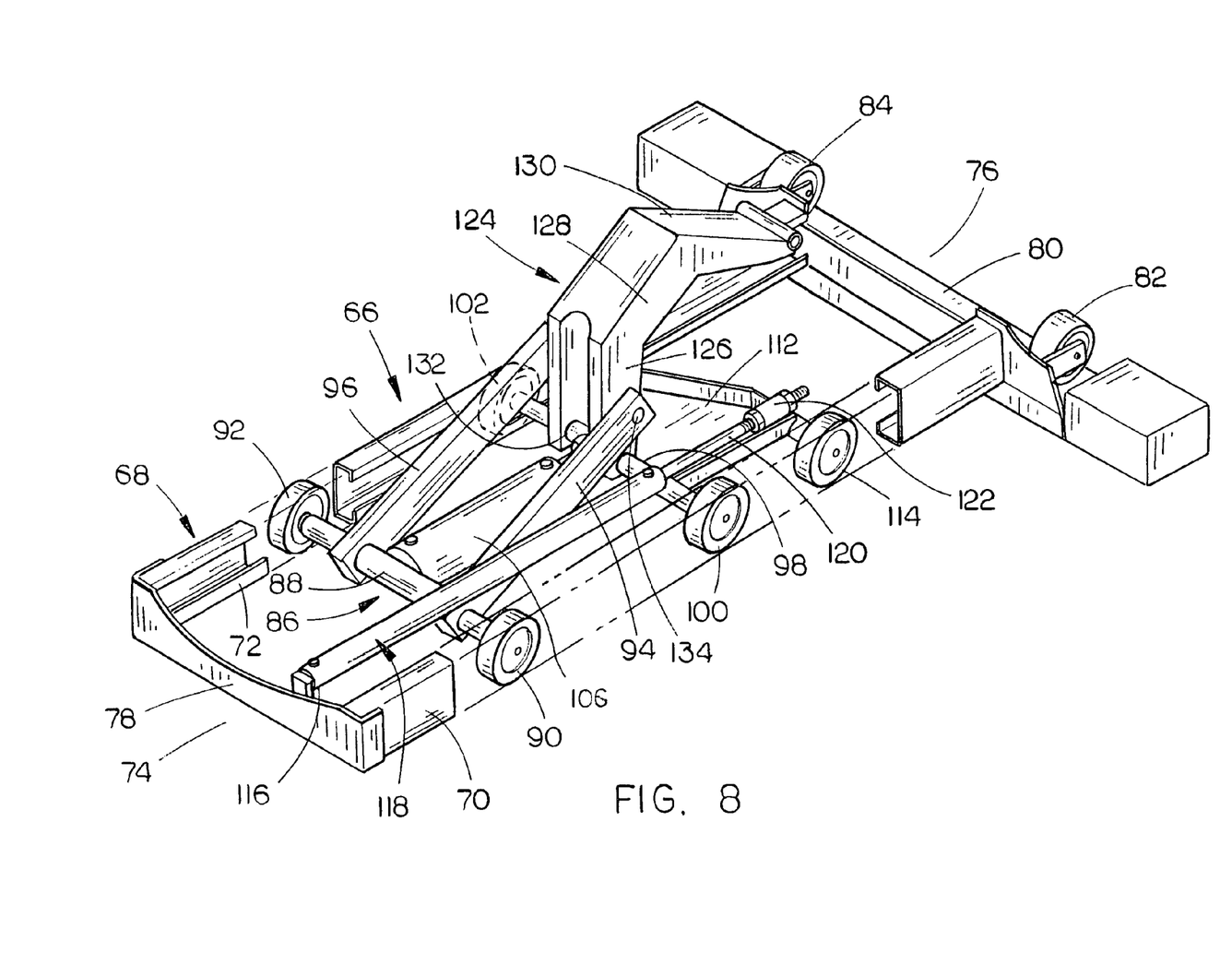
FIG. 8 is a front perspective view illustrating the truck bed frame and the carriage assembly of this invention.

The mechanism for selectively moving the bed 28 between its normal transport position of FIG. 1 and the loading/unloading position illustrated by broken lines in FIG. 3 is best illustrated in FIG. 8 and which is generally designed by the reference numeral 66. Mechanism 66 includes a frame means 68 having a pair of channel-shaped frame members 70 and 72 extending between the forward end 74 of frame means 68 and the rearward end 76 of frame means 68. The forward ends of frame members 70 and 72 have a cross-member 78 secured thereto and extending therebetween. A bumper-like frame member 80 is provided at the rearward end of frame means 68 and has a pair of rollers 82 and 84 mounted thereon.

Mechanism 66 also includes a carriage assembly 86 which is movably mounted on the frame means 68. Carriage assembly 86 includes a front shaft or support 88 having rollers 90 and 92 rotatably mounted on the ends thereof. Rollers 90 and 92 are movably received within the frame members 70 and 72 respectively (FIG. 8). A pair of elongated arms 94 and 96 have their forward ends secured to front shaft 88 and extend rearwardly therefrom.

Figure 10:
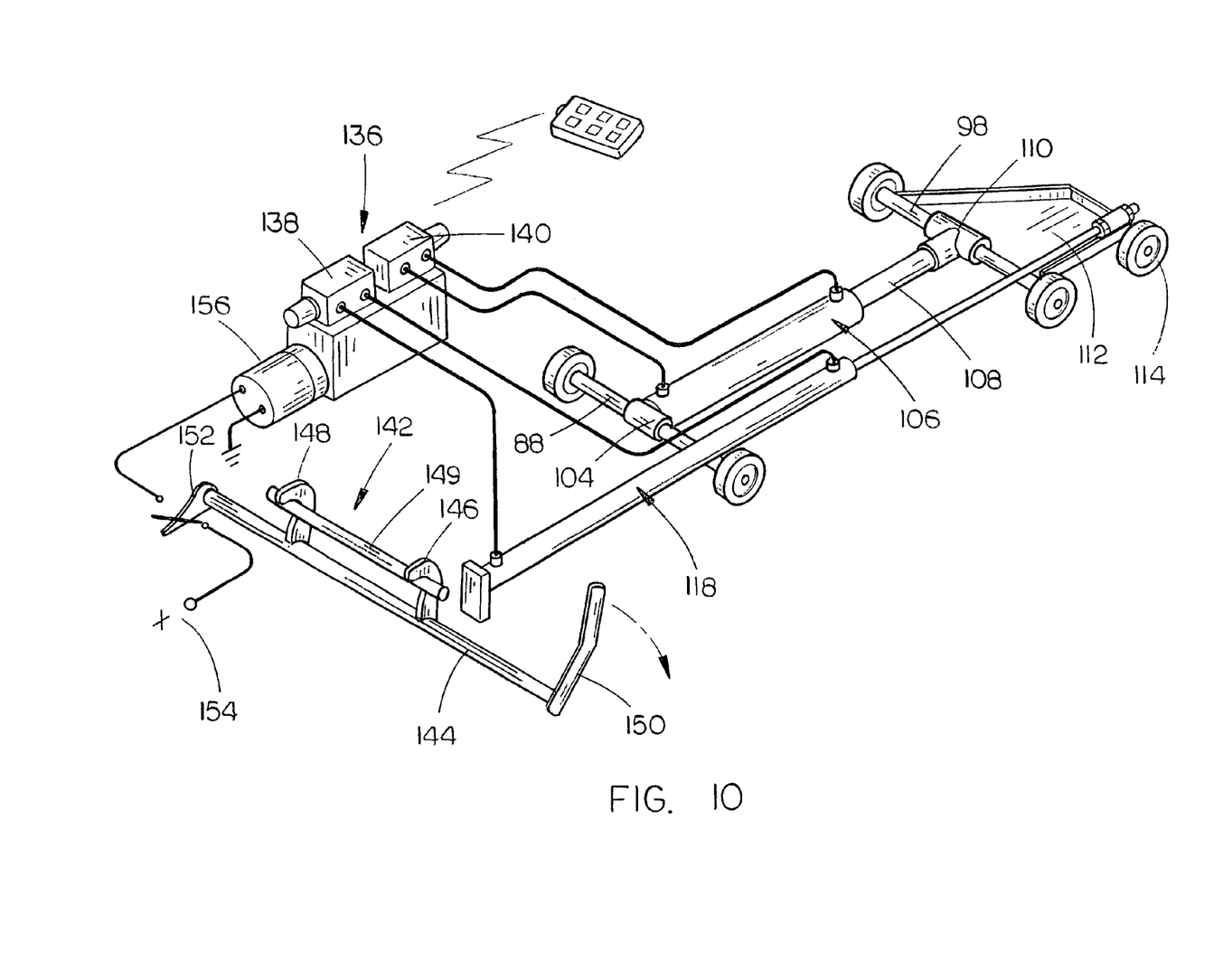
FIG. 10 is a schematic view illustrating the hydraulic circuitry and safety mechanism of this invention.

Carriage assembly 86 also includes a rear shaft or support 98 having rollers 100 and 102 rotatably mounted on the ends thereof. Rollers 100 and 102 are also movably received within the frame members 70 and 72 respectively rearwardly of the rollers 90 and 92. The forward or base end 104 of hydraulic cylinder 106 is secured to front shaft 84 (FIG. 10). The cylinder rod 108 of cylinder 106 is secured to rear shaft 98 at 110. Cylinder 106 is a double acting cylinder so that the rod 108 may be retracted and extended in conventional fashion. Although it is preferred that cylinder 106 is a hydraulic cylinder, cylinder 100 could be a pneumatic cylinder or an electronically powered screw actuator.

A support 112 is secured to rear shaft 98 and extends rearwardly therefrom. Roller 114 is rotatably mounted on the rearward end of support 112 and is movably received within frame member 70 (FIG. 8). The forward end 116 of hydraulic cylinder 118 is secured to the cross-member 78 (FIG. 8) with the cylinder 118 extending rearwardly therefrom. The rod 120 of cylinder 118 is secured to support 112 adjacent the rearward end thereof at 122.

A gooseneck-like frame member or connector member 124 including frame or connector portions 126, 128 and 130 is provided for interconnecting the bed 28 to the carriage assembly 86. The lower end of frame portion 126 is pivotally mounted on the shaft 120 at 132 about a horizontal axis. The rearward ends of arms 94 and 96 are pivotally secured to frame portion 120 at 134 which is above the pivotal connection 132. The end of frame portion 130 is pivotally connected to the pivot rod 42.

The numeral 136 refers to an electrically powered hydraulic pump assembly including a valve 138 for controlling the operation of the double acting hydraulic cylinder 118 and includes a valve 140 for controlling the operation of the double acting hydraulic cylinder 106. Preferably, the valves 138 and 140 are remotely radio controlled.

The numeral 142 refers to a safety mechanism for preventing the operation of the hydraulic pump assembly when the truck is transporting an ATV, snowmobile, etc. thereon. An elongated rod or shaft 144 is rotatably mounted on the frame of the vehicle and has a pair of hooks 146 and 148 extending therefrom which are adapted to engage a shaft 149 secured to the bed 28 when the handle 150 is in the position of FIG. 10 which prevents the bed 28 from moving from its transport position. When the handle 150 is in the position of FIG. 10, the actuator 152 at the end of the shaft 144 breaks the circuit between the battery power source 154 and the electric motor 156 for the hydraulic pump assembly. When handle 150 is moved to the position illustrated by the broken arrow line in FIG. 10, the actuator 152 closes the circuit between the battery power source 154 and the motor 156 to permit the bed 28 to be moved.

Figure 2:
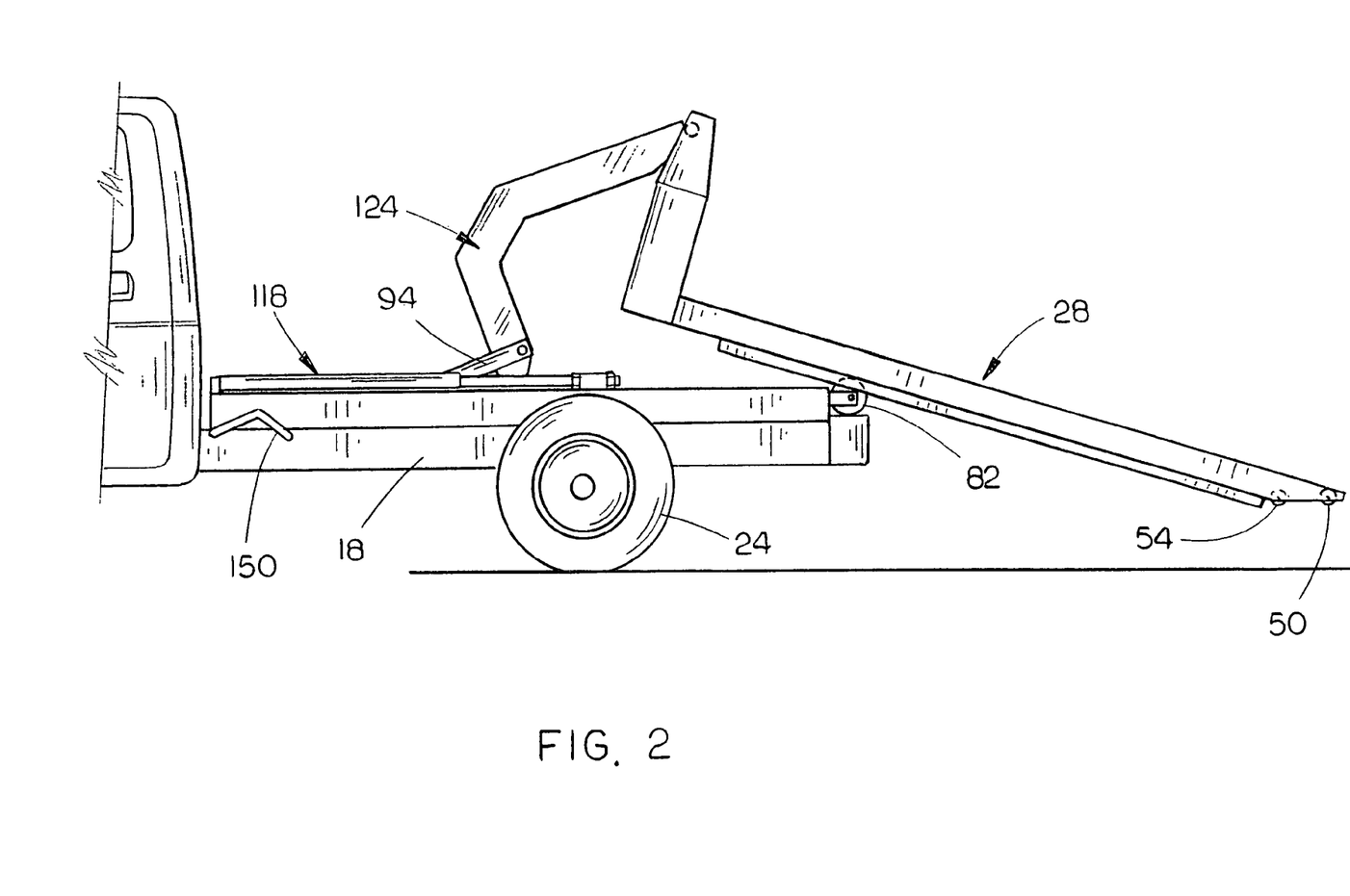
FIG. 2 is a side view of the apparatus of FIG. 1 with the truck bed being positioned between its transport position and its loading position.
Figure 4:
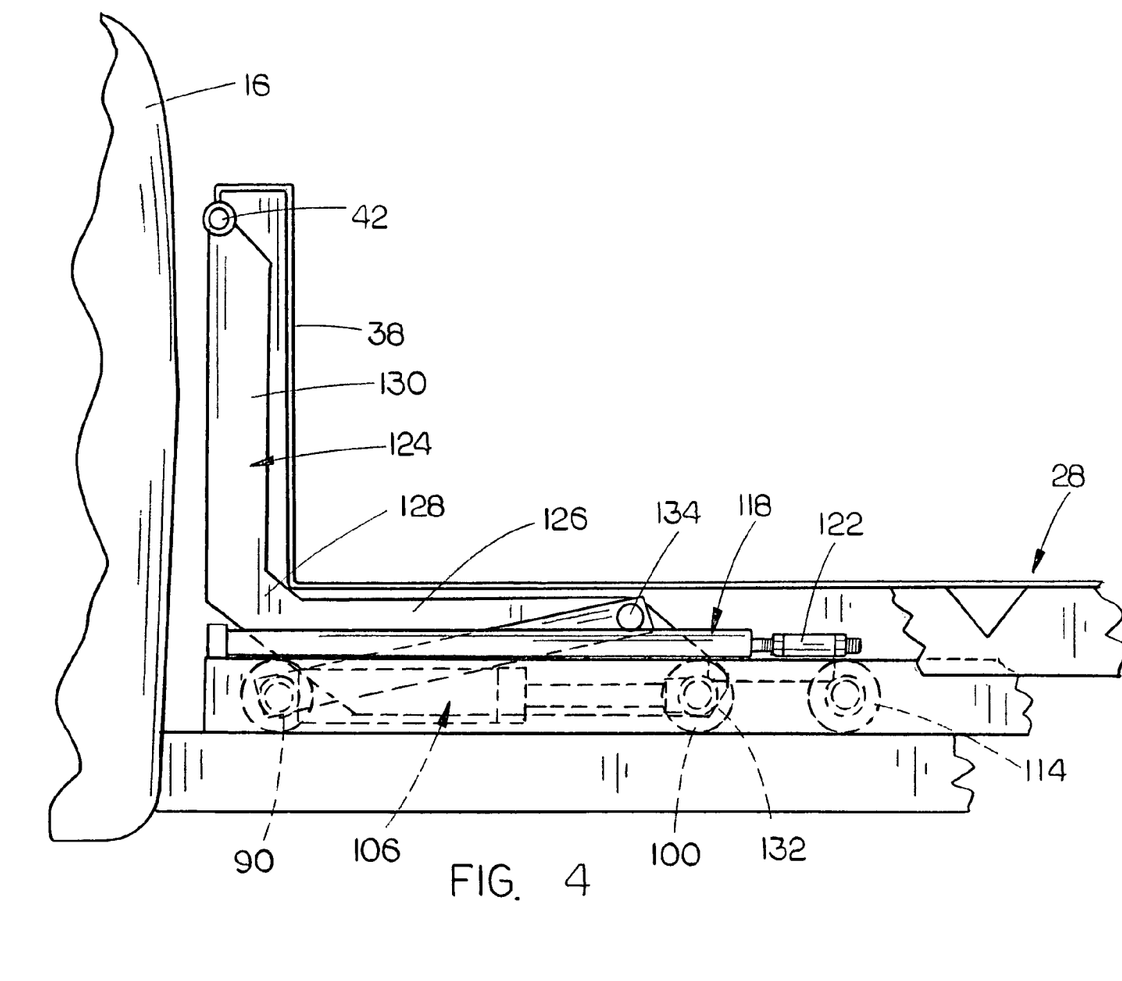
FIG. 4 is a partial side elevational view of the truck bed of this invention in its transport position.
Figure 5:
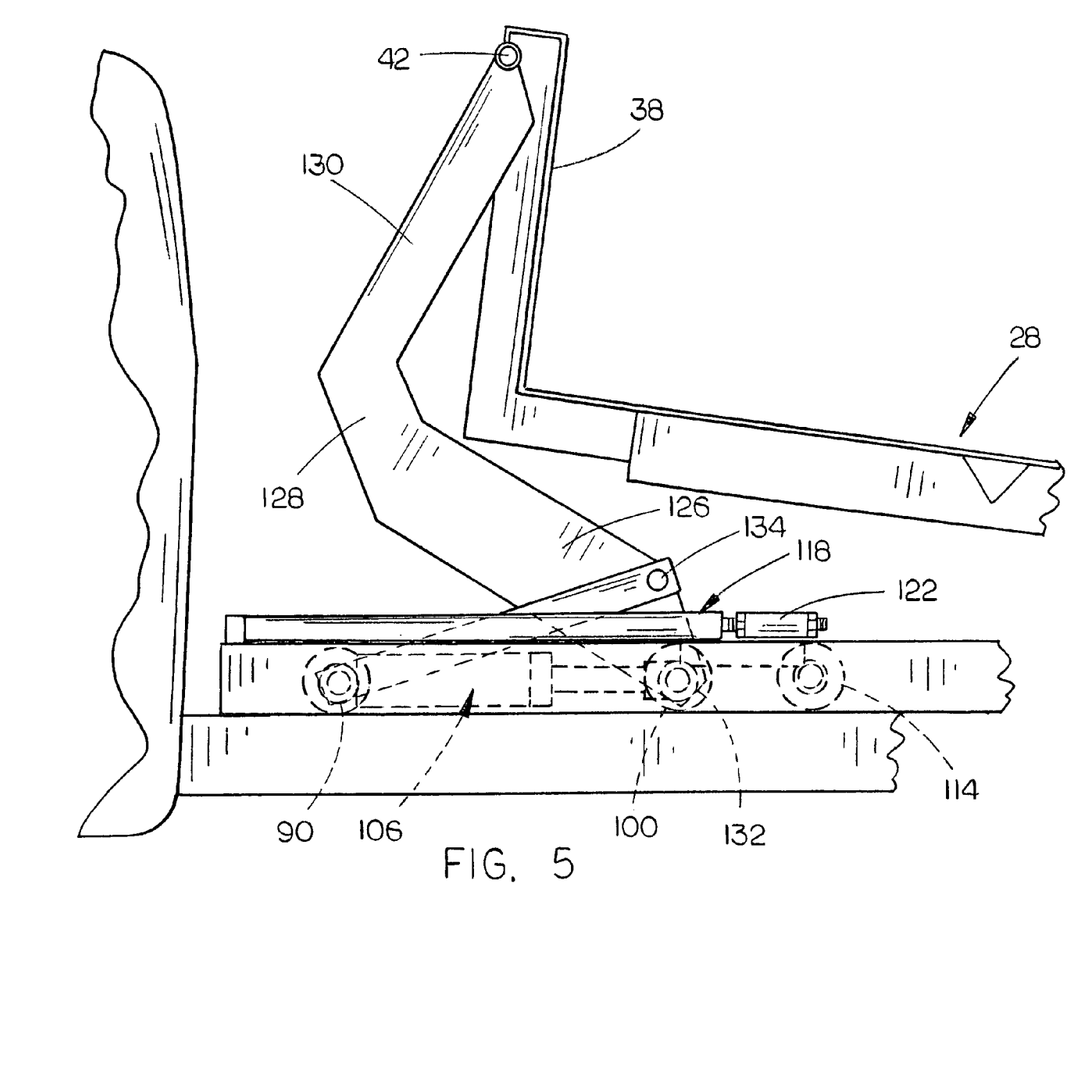
FIG. 5 is a view similar to FIG. 4 except that the truck bed has been partially moved from its transport position to its loading position.

In operation, assuming that the bed 28 is in the transport position of FIG. 1, the bed 28 is selectively movable from the transport position to the open line loading/unloading position as illustrated in FIG. 3. The first step in the process is to move the handle 150 from the lock position of FIG. 1 to the unlock position of FIG. 2 so that the hooks 146 and 148 are disengaged from the shaft 149. Cylinder 106 is then retracted to pivotally move the connector member 124 from the position of FIG. 4 towards the position illustrated in FIG. 3. Cylinder 118 is then extended to cause the carriage assembly 86 to be moved rearwardly so that the bed 28 is moved rearwardly with respect to the truck bed in conjunction with the pivotal movement of the connector member 124. The cylinder 106 is retracted and the cylinder 118 is extended to cause the bed 28 to be moved from the position of FIG. 1 to the broken line position of FIG. 3.

With the bed 28 resting on the ground, an ATV or other vehicle may be driven onto the bed 28 and secured thereto. The hydraulic cylinder 106 is then extended and the cylinder 118 is retracted to move the truck bed back upwardly and forwardly onto the vehicle to the position of FIG. 1. The rollers at the rear end of the truck bed permit the truck bed to roll along the ground during the movement of the truck bed from the position illustrated by solid lines in FIG. 3 to the position illustrated by broken lines in FIG. 3 and vice versa. The rollers 82 and 84 also facilitate the movement of the bed 28 with respect to the truck.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
   a truck having forward and rearward ends;
   said truck including a cab at the forward end thereof;
   said truck including a wheeled frame which extends rearwardly from said cab;
   a bed frame secured to said wheeled frame means rearwardly of said cab;
   said bed frame including longitudinally extending first and second horizontally disposed and horizontally spaced frame rails with forward and rearward ends;
   a movable carriage assembly longitudinally movably mounted on said bed frame;
   said carriage assembly including:
   (a) an elongated front support, having first and second ends, extending between said first and second frame rails of said bed frame;
   (b) a first roller mounted on said first end of said front support which movably engages said first frame rail of said bed frame;
   (c) a second roller mounted on said second end of said front support which movably engages said second frame rail of said bed frame;
   (d) an elongated intermediate support spaced rearwardly of said front support, having first and second ends, extending between said first and second frame rails of said bed frame;
   (e) a third roller mounted on said first end of said intermediate support which movably engages said first frame rail of said bed frame;
   (f) a fourth roller mounted on said second end of said intermediate support which movably engages said second frame rail of said bed frame;
   (g) a rear support, having forward and rearward ends, secured to said intermediate support which extends rearwardly from said intermediate support;
   (h) a fifth roller secured to said rear support adjacent said rearward end thereof which movably engages one of said first and second frame rails of said bed frame;
   (i) a first power cylinder, being movable between retracted positions and having a base end and a rod end;
   (j) said base end of said first power cylinder being secured to said front support;
   (k) said rod end of said first power cylinder being secured to said intermediate support;
   (l) a second power cylinder being movable between retracted and extended positions and having a base end and a rod end;
   (m) said base end of said second power cylinder being secured to said bed frame adjacent the forward end thereof;
   (n) said rod end of said second power cylinder being secured to said rear support;
   (o) a pair of elongated pivot arms having first and second ends;
   (p) said first ends of said pivot arms being operatively pivotally secured to said front support;
   (q) a bed connector having a first connector portion, an intermediate connector portion and a second connector portion;
   (r) said first connector portion being pivotally secured to said intermediate support;
   (s) said first connector portion being pivotally connected to said pair of pivot arms between the pivotal connection of said first connector portion with said intermediate support and said intermediate connector portion;
   a truck bed positioned on said bed frame rearwardly of said cab;
   said truck bed including a support bed portion having a forward end, a rearward end, and opposite sides;
   said truck bed also including an upstanding front wall having rearward and forward sides;
   said truck bed also including an upstanding front wall having rearward and forward sides;
   said second connector portion being pivotally secured, about a horizontal axis, to said front wall of said truck bed at the forward side thereof;
   said truck bed being selectively movable between a transport position wherein said support bed is in a horizontally disposed position over said wheeled frame and a loading position wherein said support bed is positioned rearwardly of said wheeled frame;
   said first power cylinder being in its extended position when said truck bed is in its said transport position and being in its retracted position when said truck bed is in its said loading position;
   said second power cylinder being in its said retracted position when said truck bed is in its said transport position and being in its said extended position when said truck bed is in its said loading position;
   said second connector portion of said bed connector being positioned forwardly of said front wall of said truck bed when said truck bed is in its said transport position.

2. The combination of claim 1 wherein a locking mechanism is provided for locking said truck bed in its said transport position.

3. The combination of claim 1 wherein said power cylinders are radio controlled.

4. The combination of claim 1 wherein said power cylinders are double-acting cylinders.

5. The combination of claim 1 wherein said bed frame includes rollers at the rearward end thereof for engagement with said truck bed as said truck bed is moved between its transport and loading positions.

6. The combination of claim 1 wherein said truck bed has rollers mounted at its rearward end for engagement with the ground as said truck bed is moved between its said transport and loading positions.

7. The combination of claim 1 wherein said power cylinders are driven by a sequencing means which initially moves said first power cylinder from its said extended position to its said retracted position and then moves said second power cylinder from its said retracted position to its said extended position as said truck bed is moved from its said transport position to its said loading position.

* * * * *